United States Patent
Kanzaki et al.

(10) Patent No.: US 10,664,119 B2
(45) Date of Patent: May 26, 2020

(54) DOCUMENT CONTENT POOL

(71) Applicant: International Business Machines Corporation, Armonk, NY (US)

(72) Inventors: Eisuke Kanzaki, Kanagawa-ken (JP); Akira Sudoh, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 452 days.

(21) Appl. No.: 15/398,276

(22) Filed: Jan. 4, 2017

(65) Prior Publication Data
US 2018/0191790 A1 Jul. 5, 2018

(51) Int. Cl.
*G06F 3/048* (2013.01)
*G06F 16/687* (2019.01)
*H04L 29/08* (2006.01)
*G06F 16/35* (2019.01)
*G06F 16/732* (2019.01)
*G06F 16/16* (2019.01)

(52) U.S. Cl.
CPC .............. *G06F 3/048* (2013.01); *G06F 16/16* (2019.01); *G06F 16/168* (2019.01); *G06F 16/35* (2019.01); *G06F 16/687* (2019.01); *G06F 16/7335* (2019.01); *H04L 67/10* (2013.01); *H04L 67/1097* (2013.01)

(58) Field of Classification Search
CPC ... H04L 67/1097; H04L 67/10; G06F 16/168; G06F 16/35; G06F 3/048; G06F 16/687; G06F 16/7335
See application file for complete search history.

(56) References Cited

U.S. PATENT DOCUMENTS

| 7,162,473 B2 | 1/2007 | Dumais et al. |
| 7,668,849 B1 | 2/2010 | Narancic et al. |
| 8,095,572 B1 | 1/2012 | Coghlan |
| 9,262,449 B2 | 2/2016 | Amarendran et al. |

(Continued)

OTHER PUBLICATIONS

Kalfus et al., "A selective data retention approach in massive databases", http://www.boazronen.org/PDF/SelectiveDataRetention.pdf, Omega 32, 2004, pp. 87-95.

(Continued)

*Primary Examiner* — David R Lazaro
*Assistant Examiner* — Xiang Yu
(74) *Attorney, Agent, or Firm* — Richard Wilhelm; Edell, Shapiro & Finnan, LLC

(57) ABSTRACT

A method, a computing device and a computer program product are provided. A content pool view is displayed on a display. The content pool view includes a node retain area and a node delete area. The node retain area has a number of retention periods for retaining contents of documents. Responsive to a user selecting a document via a computing device and dropping the document on a drop position in the node retain area, a node associated with the content of the document is displayed in the drop position of the content pool view. A retention period of the node is set based on the drop position in the node retain area. After a passing of a period of time, the node is moved toward the node delete area while decreasing the set retention period. Responsive to the node being moved into the node delete area, the node is deleted.

20 Claims, 16 Drawing Sheets

(56) References Cited

U.S. PATENT DOCUMENTS

| | | | |
|---|---|---|---|
| 9,418,174 B1* | 8/2016 | Gan | G06F 16/84 |
| 2012/0278533 A1* | 11/2012 | Suzuki | G11C 16/3404 |
| | | | 711/103 |
| 2012/0303629 A1 | 11/2012 | Klein et al. | |
| 2016/0036872 A1* | 2/2016 | Lappin | H04L 65/403 |
| | | | 709/204 |
| 2018/0198863 A1* | 7/2018 | Davis | H04L 67/1097 |

OTHER PUBLICATIONS

Bibliographic Data for Japanese Patent Application Publication No. JP2007257174, Espacenet Oct. 4, 2007.

* cited by examiner

DOCUMENT CONTENT POOL

BACKGROUND

Present invention embodiments are related to systems, methods and computer program products for finding specific documents stored in a memory. In particular, present invention embodiments are related to systems, methods and computer program products for finding specific documents stored in a memory, determining relationships among similar documents stored in the memory, and indicating a strength of a relationship among the similar documents.

To find specific and related documents in existing document storage systems, a user performs a document search based on search keywords. In results of a full-text search, desired information may be buried among voluminous information that is irrelevant to the user, thereby making review of search results difficult and time consuming. In addition, the search results fail to indicate similar documents and a level of similarity among the similar documents. When updating or creating a document, existing systems do not provide any information regarding similar existing documents stored in a storage device or a memory.

SUMMARY

In a first aspect of the invention, a method is provided for automatically managing contents of multiple documents in a memory. A computing device displays a content pool view on a display. The content pool view may include a node retain area and a node delete area. The node retain area may have multiple retention periods for retaining the contents of the documents. A node, associated with content of a document, is displayed in a drop position of the content pool view in response to a user selecting the document via the computing device and dropping the document on the drop position in the node retain area. The computing device sets a retention period of the node based on the drop position in the node retain area. After a passing of a period of time, the computing device moves the node toward the node delete area while decreasing the set retention period associated with the node. The computing device deletes the node from the content pool view in response to the node being moved into the node delete area.

In a second aspect of the invention, a computing device is provided for automatically managing content of multiple documents in a memory. The computing device includes at least one processor, a memory, a display device and a bus. The bus connects the at least one processor with the memory and the display device. The memory includes instructions for the least one processor to be configured to: display a content pool view on the display device, the content pool view including a node retain area and a node delete area, the node retain area has multiple retention periods for retaining the contents of the documents; display, on the display device, a node associated with a content of a document in a drop position of the node retain area of the content pool view in response to a user selecting and dropping the document on the drop position; set a retention period of the node based on the drop position of the node retain area; move, after the passing of a period of time, the node toward the node delete area while decreasing the set retention period; and deleting the node from the content pool view in response to the node being moved into the node delete area.

In a third aspect of the invention, a computer program product is provided which has at least one computer readable storage medium including computer readable program code embodied therewith for execution on a computing device. The computer-readable program code is configured to be executed by the computing device to: display a content pool view on a display, the content pool view including a node retain area and a node delete area, the node retain area having multiple retention periods for retaining the contents of the multiple documents; display a node associated with a content of a document in a drop position of the content pool view in response to a user selecting the document via the computing device and dropping the document on the drop position in the node retain area; set a retention period of the node based on the drop position in the node retain area; move, after a passing of a period of time, the node toward the node delete area while decreasing the set retention period; and delete the node from the content pool view in response to the node being moved into the node delete area.

The above-mentioned embodiments include an ability to choose a retention period for a document based on a drop position of a selected document dropped onto a content pool. Further, the above-mentioned embodiments provide a visual representation of most recently selected documents and a relative period of time for retaining the documents in the content pool.

In some of the embodiments, a retention period of a document represented by a node in the content pool may be increased and the node in the content pool moved further from a node delete area based on a number of times content associated with the node is accessed. This feature is advantageous because the more content associated with the node is accessed, the longer the node will remain in the content pool. Thus, nodes associated with frequently accessed content may be retained in the content pool longer that nodes associated with seldomly accessed content.

In various embodiments, a link between multiple nodes in a node retain area may be displayed based on a relationship between the nodes. This feature simplifies a task of finding similar documents among a number of documents represented by nodes in a content pool.

In some of the various embodiments in which the link between multiple nodes in the node retain area is displayed based on a relationship between the multiple nodes, a vertical distance between pairs of related nodes provide an indication of a strength of the relationship between the pairs of nodes, where a first pair of related nodes having a shorter vertical distance between each other have a stronger relationship than a second pair of related nodes having a longer vertical distance between each other. This feature simplifies the task of finding closely related documents represented by nodes in a content pool.

BRIEF DESCRIPTION OF THE DRAWINGS

Generally, like reference numerals in the various figures are utilized to designate like components.

DETAILED DESCRIPTION

Figure 1:
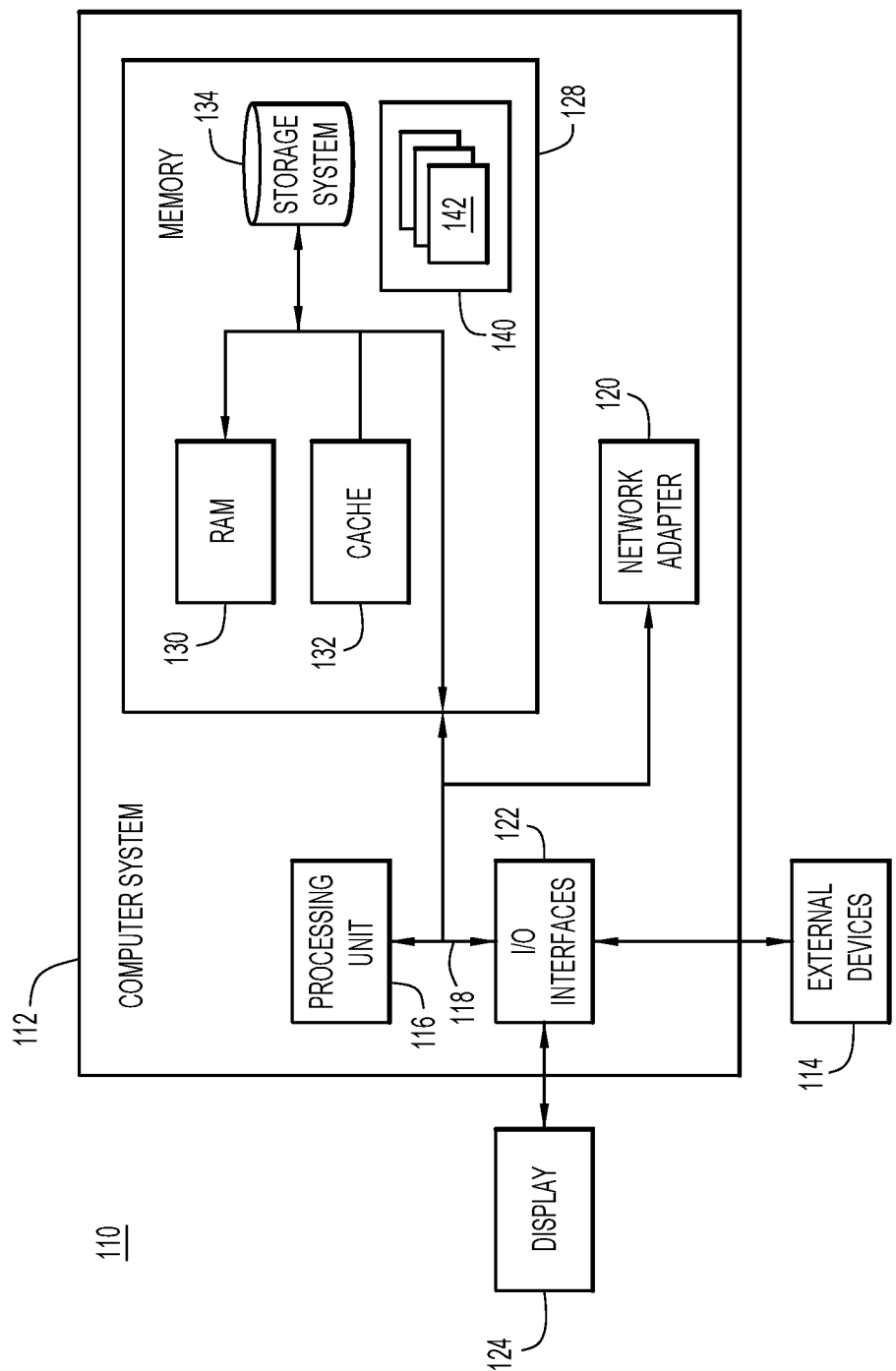
FIG. 1 illustrates an example processing device for implementing various embodiments.

In one embodiment of the present invention, a user may place a document into a content pool and may choose a retention period for the document by selecting a document and dropping the document onto the content pool, where the retention period is based on a drop position of the selected document. Further, when a document not in the content pool is accessed, nodes representing related documents will have their respective retention periods in the content pool increased with a visual indication indicating an increased retention period based on an updated position of the nodes in the content pool. Thus, documents associated with frequently accessed content are more likely to be retained longer in the content pool than documents associated with seldomly accessed content. When a document is added or modified in the content pool, the added or modified document will be compared with each other document in the content pool to determine an existence of a relationship with each of the other documents, where a relationship is visually indicated by displaying a link between pairs of nodes having related documents. Thus, embodiments may simplify a task of finding similar content in the content pool. In addition, to indicating related documents in the content pool, a strength of a relationship between pairs of related documents in the content pool of an embodiment may be indicated by a vertical distance between pairs of displayed nodes associated with respective pairs of related documents, where pairs of nodes associated with strongly related documents have a shorter vertical distance therebetween than a vertical distance between pairs of related nodes associated with respective pairs of weaker related documents. Thus, simplifying a task of finding strongly related documents.

In various embodiments, a computer-implemented method, a computing device, and a computer program product are provided for automatically managing contents of multiple documents in a memory. The content pool view has a node retain area for retaining documents associated with displayed nodes in the content pool view and a node delete area. The node retain area has multiple retention periods for retaining contents of documents represented by displayed nodes. A retention period for a document is based on a position of a node displayed in the node retain area.

Nodes may be displayed as rectangles, squares, circles or other shapes in the content pool view. In some embodiments, a user may select a document and drag and drop the document onto the node retain area. As a result, a node representing the document may be displayed in the node retain area and may have a retention period based on a position in the node retain area at which the document is dropped.

After a period of time passes, displayed nodes may be moved toward the node delete area and a respective retention period associated with each of the moved nodes is decreased. In response to a node being moved into the node delete area, the node may be deleted from the content pool.

Responsive to a user selecting a node, content of a document associated with the selected node may be displayed.

In various embodiments, a number of features may be implemented as described in more detail below.

An example processing device 110 in which an embodiment of the invention may be implemented is shown in FIG. 1. In some embodiments, multiple processing devices connected with each other via a network may implement embodiments of the invention. As shown in FIG. 1, computer system 112 is shown in the form of a general-purpose computing device. Components of computer system 112 may include, but are not limited to, one or more processors or processing units 116, a system memory 128, and a bus 118 that couples various system components including system memory 128 to one or more processors 116.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 112 typically includes a variety of computer system readable media. Such media may be any available media that is accessible by computer system 112, and includes both volatile and non-volatile media, removable and non-removable media.

System memory 128 can include computer system readable media in the form of volatile memory, such as random access memory (RAM) 130 and/or cache memory 132. Computer system 112 may further include other removable/non-removable, volatile/non-volatile computer system storage media. By way of example only, storage system 134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 118 by one or more data media interfaces. As will be further depicted and described below, memory 128 may include at least one program product having a set (e.g., at least one) of program modules that are configured to carry out the functions of embodiments of the invention.

Program/utility 140, having a set (at least one) of program modules 142, may be stored in memory 128 by way of example, and not limitation, as well as an operating system, one or more application programs, other program modules, and program data. Each of the operating system, the one or more application programs, the other program modules, and the program data or some combination thereof, may include an implementation of a networking environment. Program modules 142 generally carry out the functions and/or methodologies of embodiments of the invention as described herein.

Computer system 112 may also communicate with one or more external devices 114 such as a keyboard, a pointing device, a display 124, etc.; one or more devices that enable a user to interact with computer system 112; and/or any devices (e.g., network card, modem, etc.) that enable computer system 112 to communicate with one or more other computing devices. Such communication can occur via Input/Output (I/O) interfaces 122. Still yet, computer system 112 can communicate with one or more networks such as a local area network (LAN), a general wide area network (WAN), and/or a public network (e.g., the Internet) via network adapter 120. As depicted, network adapter 120 communicates with the other components of computer system 112 via bus 118. It should be understood that, although not shown, other hardware and/or software components could be used in conjunction with computer system 112. Examples, include, but are not limited to: microcode, device drivers, redundant processing units, external disk drive arrays, RAID systems, tape drives, and data archival storage systems, etc.

Figure 2:
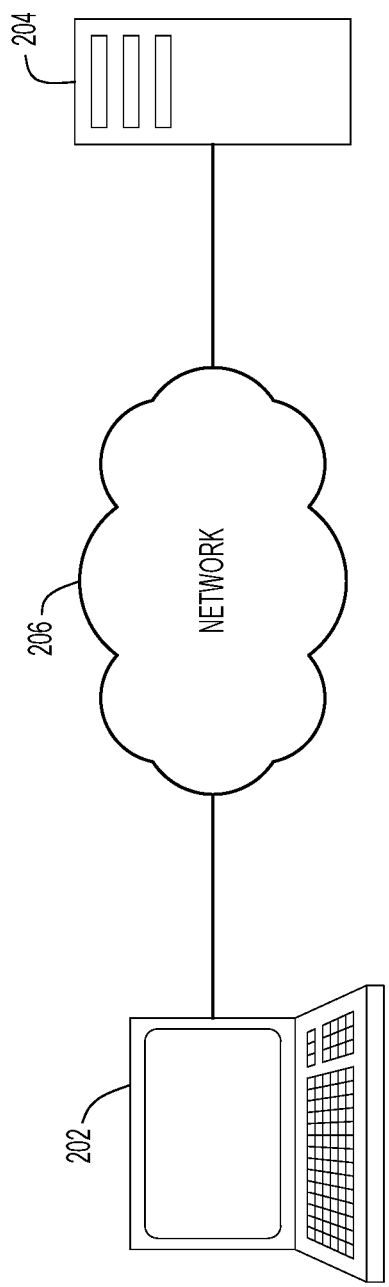
FIG. 2 shows an example environment in which various embodiments may operate.

FIG. 2 illustrates an example environment in which various embodiments may be implemented. A user device 202 and a computing device 204, each of which may include computer system 112, may be connected to a network 206. Network 206 may be a local area network (LAN), a wide area network (WAN), a wired network, a wireless network, another type of network, or a combination of any of the above-mentioned networks.

Alternatively a single computing device such as processing device 110 may include storage for documents and may implement a standalone version of various embodiments.

Figure 3:
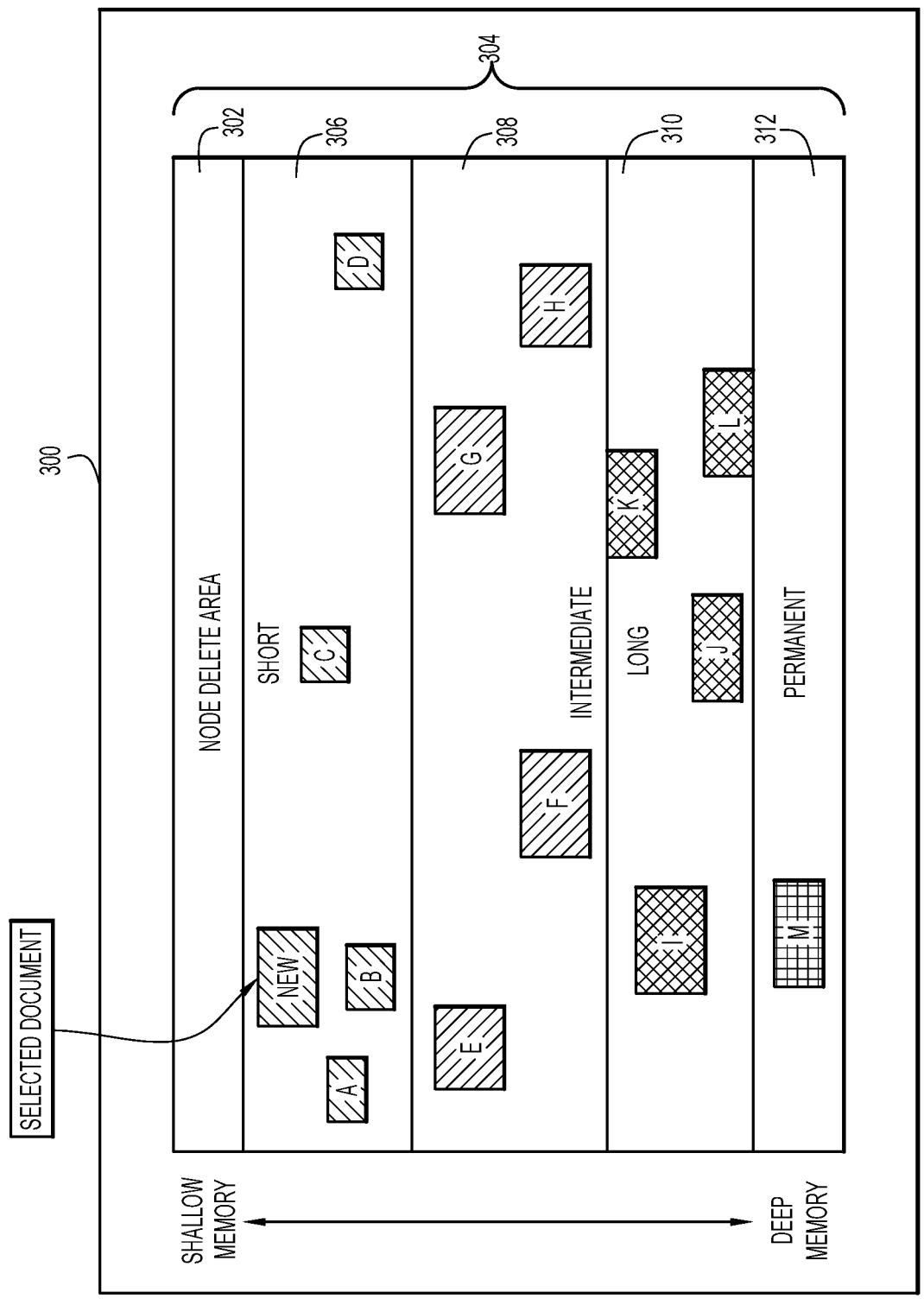
FIG. 3 illustrates an example content pool view of a content pool of an embodiment having a number of nodes associated with documents.

FIG. 3 illustrates an example content pool view of content pool 300, which may be displayed on a display of user device 202 or processing device 110 (in a standalone version). Content pool 300 may include a node delete area 302 and a node retain area 304. In some embodiments, node delete area 302 may be located above and contiguous with node retain area 304.

Node retain area 304 may include a number of nodes A through M, each of which represents content of a respective document. In FIG. 3, the nodes are shown as rectangular shapes. In other embodiments, nodes may be shown as circular shapes, square shapes, triangular shapes, or other shapes. Node retain area 304 may have a number of retention periods. Documents represented by nodes located near node delete area 302 have short retention periods (shallow memory). Documents represented by nodes located further from the node delete area 302 have a longer retention periods (deeper memory) than the nodes located near node delete area 302. In other words, the longer the vertical distance is between node delete area 302 and a position of a node, the longer the retention period is for a document represented by the node. Node retain area 304 of FIG. 3 shows a number of areas having different retention periods. For example, area 306 is an area for nodes representing documents having a short retention period (shallow memory). Area 308 is an area for nodes representing documents having an intermediate retention period. Area 310 is an area for nodes representing documents having a long retention period (deep memory). Area 312 is an area for nodes representing documents having a permanent retention period.

In some embodiments, displayed nodes may have a color associated with the area in which they reside in node retain area 304. For example, nodes in area 306 may be colored red, nodes in area 308 may be colored blue, nodes in area 310 may be colored green, and nodes in area 312 may be colored orange. Of course, in other embodiments, the nodes in different areas may have other colors.

A user may select a document with a pointing device and may drop the document onto node retain area 304, thereby causing a new node to be displayed. A node retention period associated with the new node is based on a position in node retain area 304 in which the node is dropped. This is discussed in more detail below.

After one or more particular times passes, such as midnight daily or another time period, a retention period associated with the nodes in node retain area 304, that are not located in an area having a permanent retention period, are shortened. For example, in one embodiment, the retention period of such nodes may be shortened at 12 AM each day. In other embodiments, the retention period of such nodes may be shortened at a different time each day, or at multiple times each day, week or month.

Figure 4:
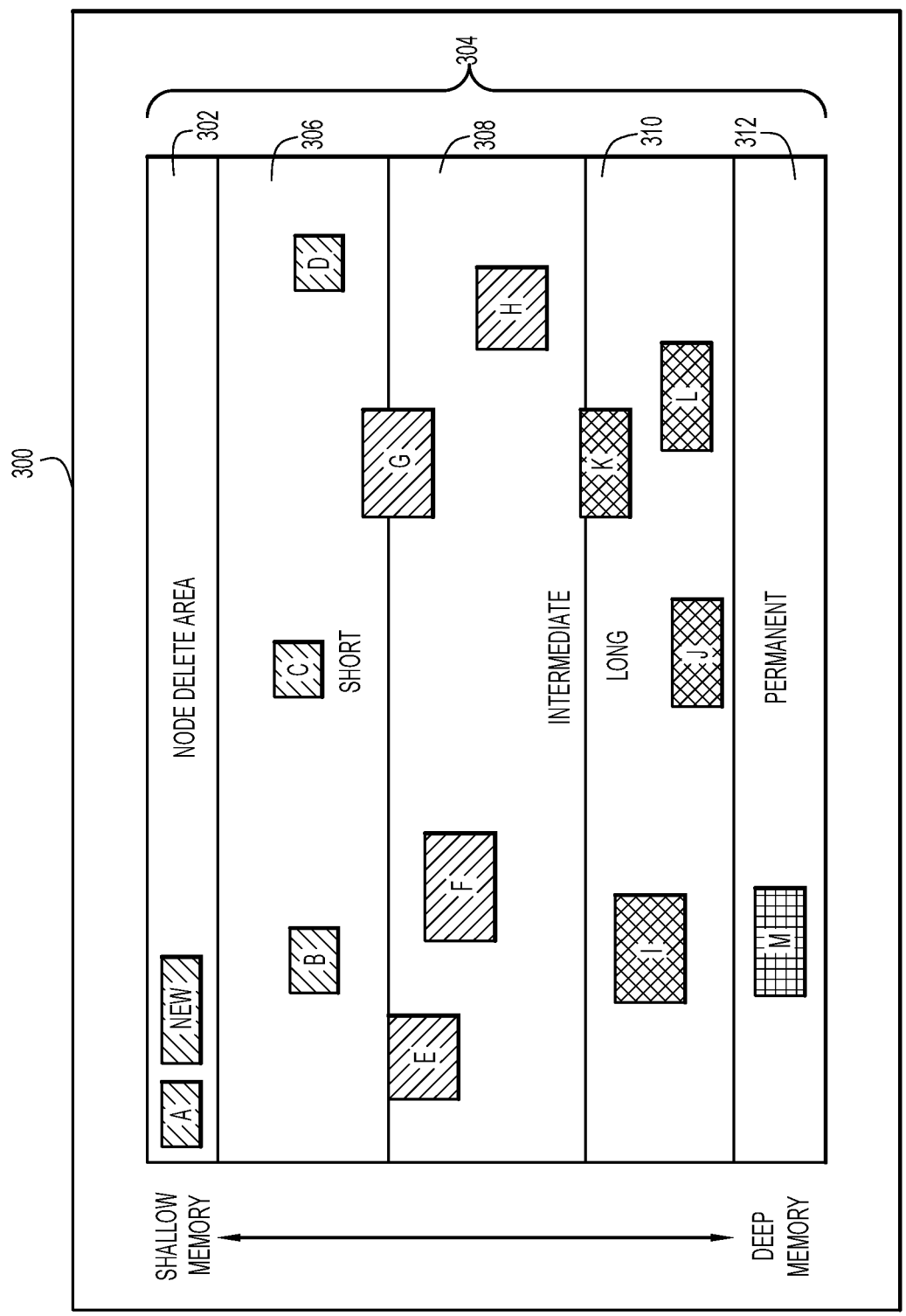
FIG. 4 shows the content pool view of FIG. 3 after a period of time passes.

FIG. 4 shows content pool view 300 after retention periods of nodes not having a permanent retention period are decreased. As shown, all nodes in FIG. 4, except node M, are moved in an upward direction, with respect to the nodes of FIG. 3. Node A and a new node have been moved into node delete area 302, at which point node A and the new node will be deleted from the content pool.

In various embodiments, an agent may categorize nodes based on an ontology and meaning equivalents of content associated with the nodes. Node retain areas of the content pool, which can be called memory areas, may be divided by category or document source. A depth rate, or retention period, may be set for each of the memory areas. Multiple nodes associated with identical content may be merged automatically by the agent in some embodiments.

Figure 5:
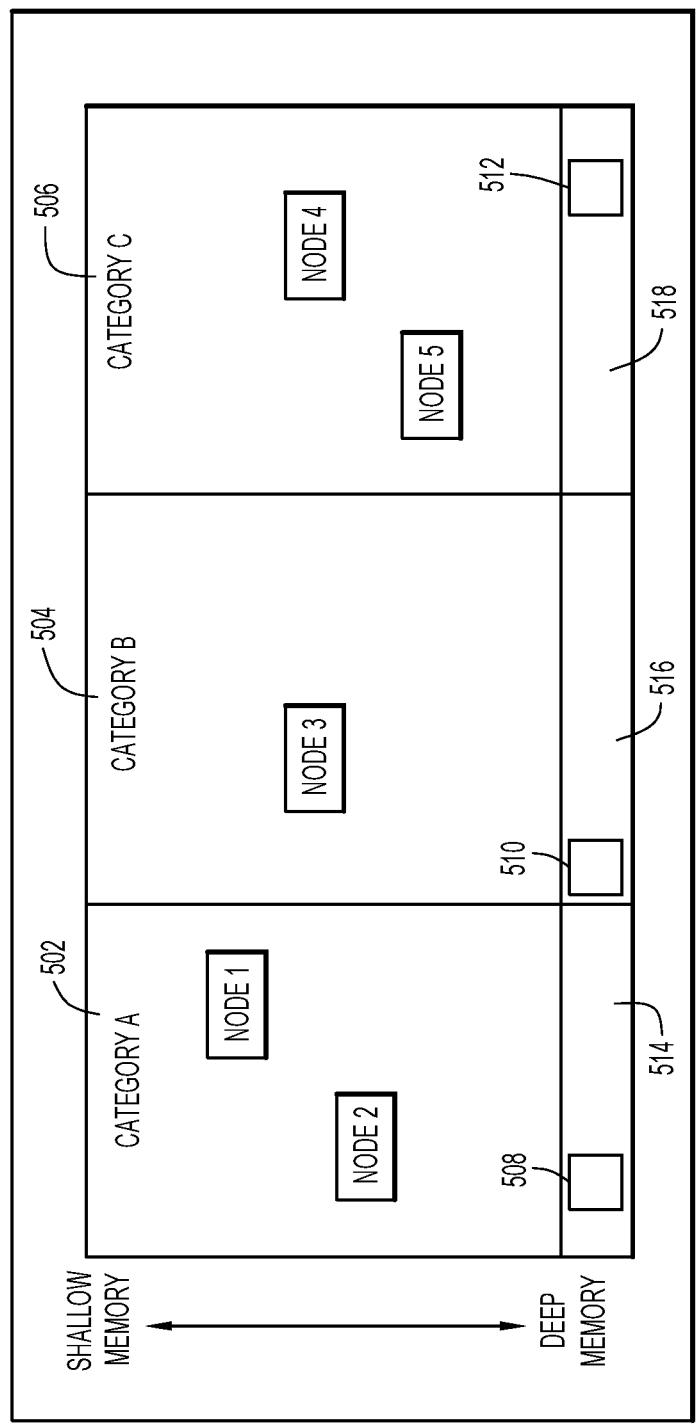
FIG. 5 illustrates an example content pool of an embodiment having memory areas divided into a number of categories for nodes associated with documents categorized within corresponding categories.

FIG. 5 illustrates an example content pool having memory areas divided into multiple memory areas 502, 504, 506 for categories A, B and C, respectively. FIG. 5 shows nodes 1 and 2 in category A 502, node 3 in category B 504, and nodes 4 and 5 in category C 506. In this embodiment, only a portion of each of memory areas 502, 504, 506 may be displayed at one time. Scroll elements 508, 510, 512 may be moved, using a pointing device, a touch screen, or via another method, along their respective slide bars 514, 516, 518 to scroll the respective memory areas such that a different portion of the memory area may be displayed. In this embodiment, every time content of a node is accessed, a retention period of a document represented by the node is increased and a depth of the node in the content pool is made deeper.

Periodically, content of each node may be compared with content of each other node in the content pool. A percentage of similar content with respect to pairs of documents represented by two nodes may then be determined. If the percentage of similar content of the documents exceeds a configurable relationship threshold, the two nodes are considered to be related and a line, or link, between the nodes may be displayed in the content pool view. In various embodiments, when two nodes have a percentage of similar content greater than a configurable automatic merge threshold, the two nodes and their respective content may be merged. In some of the various embodiments, when the two nodes have the percentage of similar content greater than the configurable automatic merge threshold, a merge indicator may be displayed in the content pool. If a user selects the merge indicator, then the two nodes and their respective contents may be merged.

Figure 6:
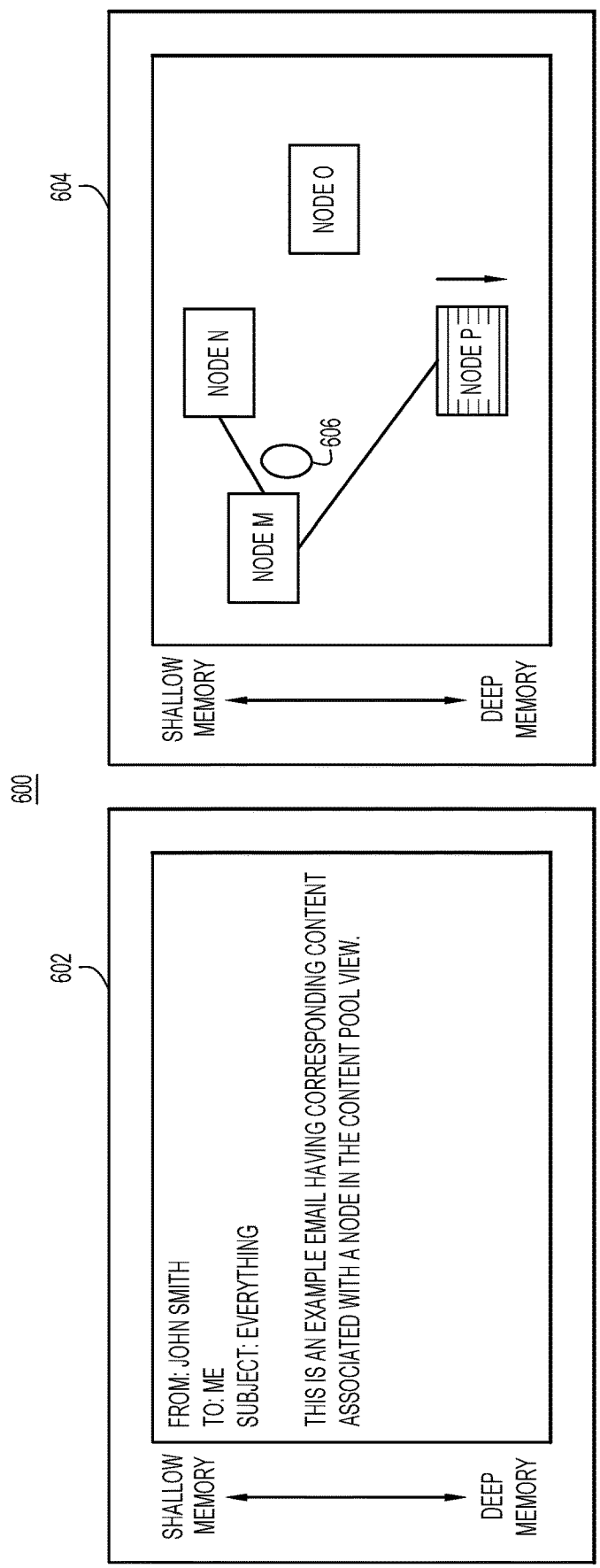
FIG. 6 shows an example mail view of an embodiment that illustrates an opened email and a content pool having a node corresponding to the opened email.

FIG. 6 illustrates an example mail view 600 in embodiments. Mail view 600 may include a displayed open email 602 in a first portion of a display and a displayed content pool 604 in a second portion of the display. When a selected email is open and displaying in mail view 602, a node having a same content as displayed open email 602 is displayed in a particular color such as, for example, red or another color, and a depth, or node retention period, of the node may be deepened, as indicated by a downward pointing arrow in content pool 604. A relationship between nodes may be indicated by a link, or line, therebetween. In content pool 604, nodes M and N are determined to have a percentage of similar content greater than the configurable automatic merge threshold. As a result, in this embodiment, merge indicator 606 may be displayed. In FIG. 6, merge indicator 606 may have an oval shape, but may have other shapes in other embodiments. When a user selects merge indicator 606, contents of nodes M and N may be merged.

Figure 7:
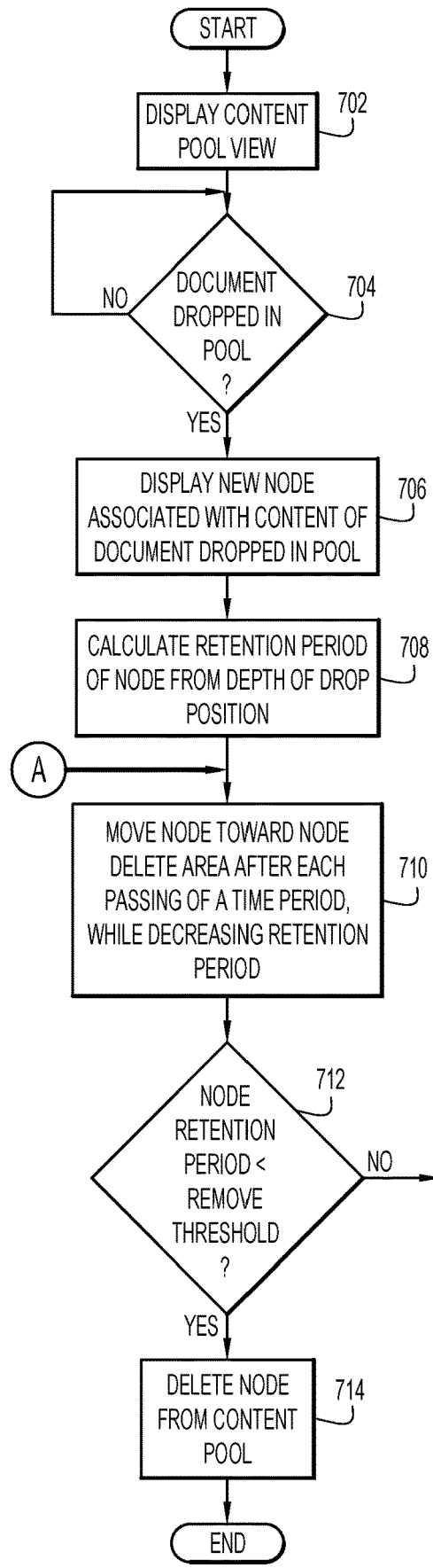
FIG. 7 shows a flowchart of an example process of an embodiment regarding a document dropped in a content pool, calculating a retention period for the document and decreasing retention periods of documents represented by nodes in the content pool at a particular time.

FIG. 7 is a flowchart of an example process that may be performed in embodiments. The process may begin with displaying a content pool view of a content pool (act 702). In a standalone implementation, the content pool view may be displayed on a display device implementing the embodiment. In an embodiment executing in the environment of FIG. 2, computing device 204 may send information through network 206 to user device 202, which executes an application that receives the information and displays the content pool view corresponding thereto. Next, a user may select a document, using a pointing device, and may drag-and-drop the document onto a node retain area of the content pool. If the user has not dragged and dropped the document onto the node retain area, the process may wait until the user drags and drops the document onto the node retain area (act 704).

Once the document is dragged and dropped onto the node retain area, a new node associated with content of the dropped document may be displayed (act 706). A retention period for the document represented by the new node may be calculated based on a depth of a drop position of the document into the node retain area (act 708). After a passing of a period of time, if the document represented by the node does not have a permanent retention period, then the node may be moved toward a node delete area (act 710) and the retention period may be decreased. If the retention period of the node is less than a configurable remove threshold (act 712), or the node is moved into a node delete area, then the node and the corresponding document may be deleted from the content pool (act 714). Otherwise, acts 710 through 714 may again be performed. If the user again selects a document to drag and drop onto the node retain area, acts 702-714 may again be performed.

Figure 8:
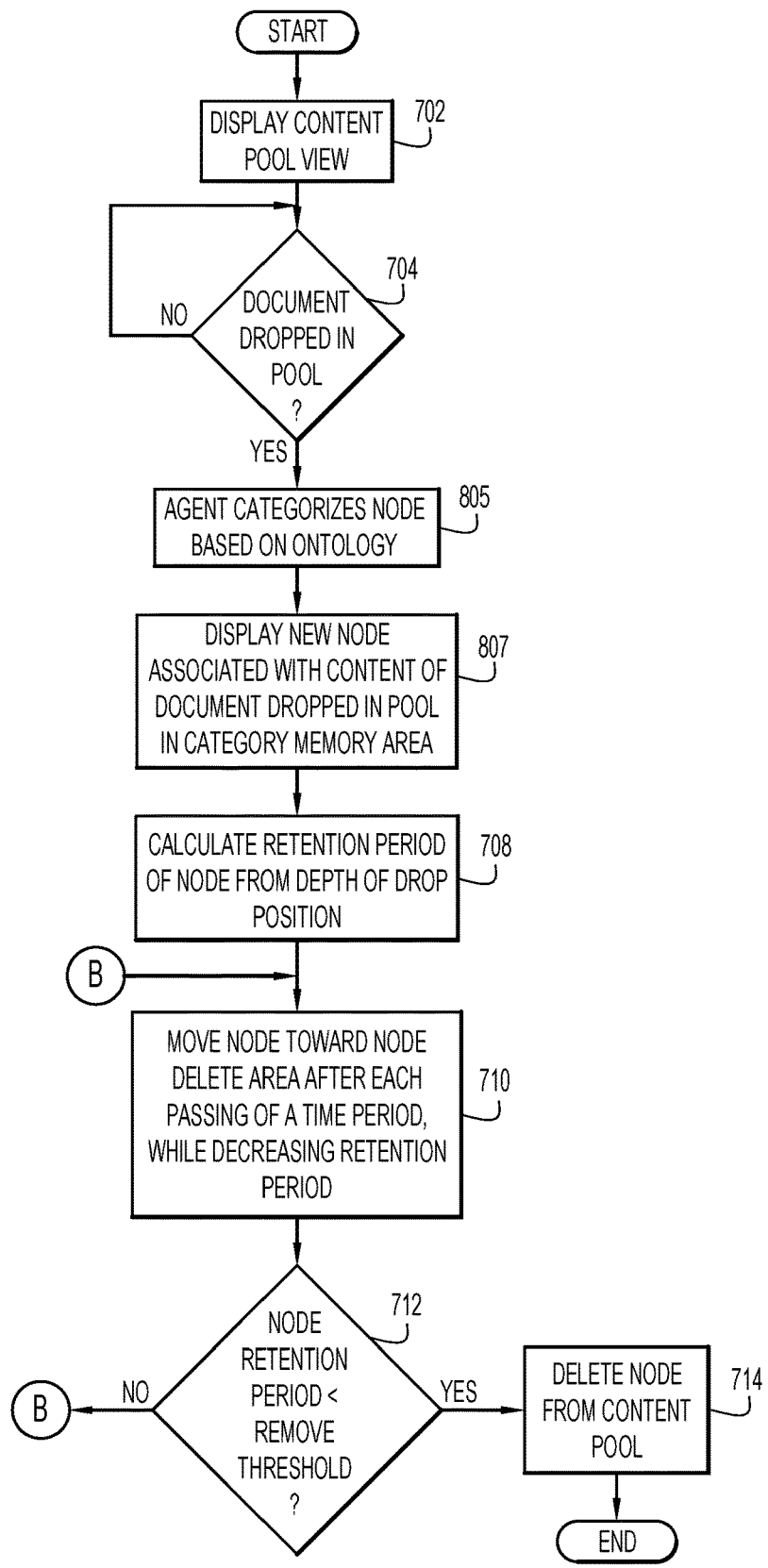
FIG. 8 shows a modified form of the flowchart of FIG. 7 for embodiments in which documents represented by nodes are categorized based on an ontology.

FIG. 8 is a flowchart of a variation of the process as shown in FIG. 7. Acts of FIG. 8 are identical to those of FIG. 7, except for acts 805 and 807. Act 805 is performed after a document is dropped in the content pool. During act 805, an agent, which may be implemented by software, hardware, or a combination, searches for keywords based on a predefined ontology in order to categorize a new node representing the document dropped into the content pool. At act 807, the new node may be displayed in a category memory area associated with a category in which the new node is categorized.

Figure 9:
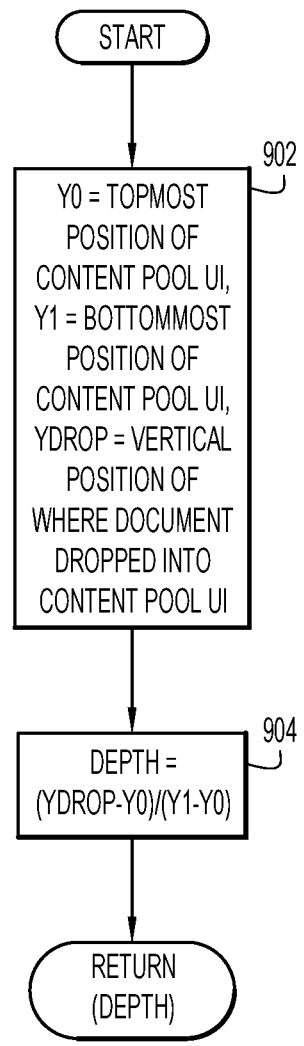
FIG. 9 is a flowchart of an example process of an embodiment for determining a retention period for a document dropped in a content pool.

FIG. 9 is a flowchart illustrating an example process for determining a memory depth (retention period) from a drop position of a document onto a content pool. The process may begin by setting Y0 to a top-most position of a content pool user interface, setting Y1 to a bottom-most position of the content pool user interface, and setting YDROP to a vertical position of where a document is dropped into the content pool user interface (act 902). Next, the depth of the drop position of a document is calculated by (YDROP−Y0)/(Y1−Y0) (act 904). The process may then return calculated depth.

Figure 10:
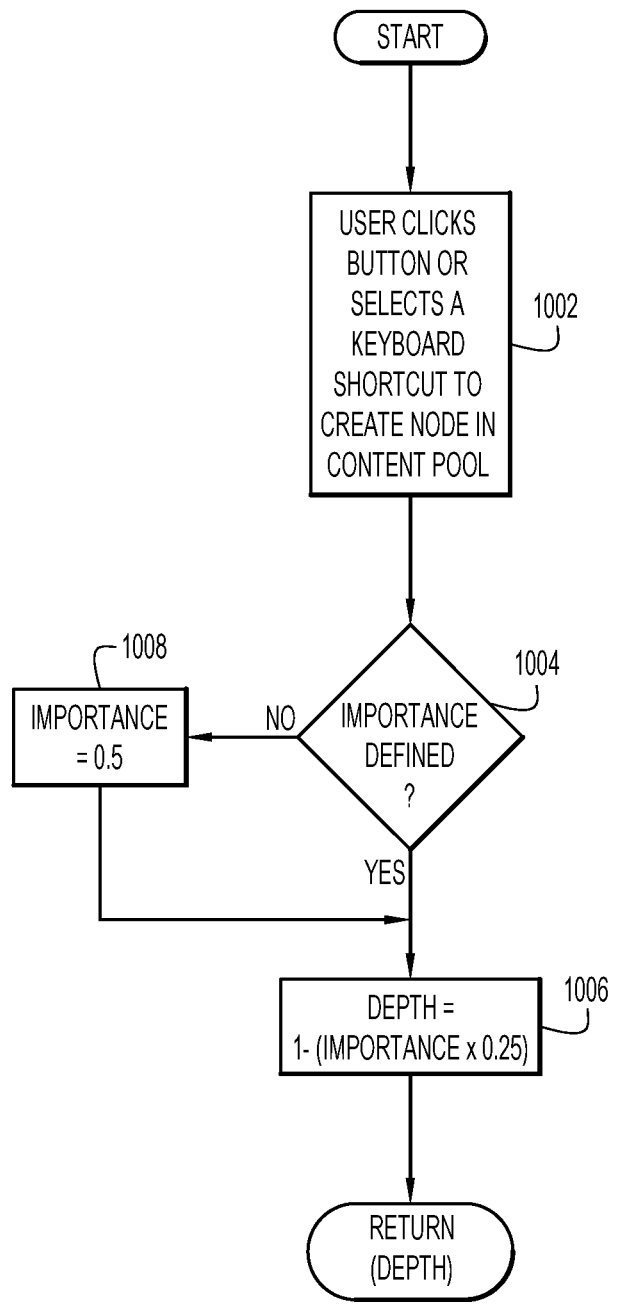
FIG. 10 is a flowchart of an example process of an embodiment, which considers importance of a document created in a content pool.

FIG. 10 is a flowchart illustrating an example process for determining a memory depth (retention period) while taking importance into consideration in an embodiment. In this embodiment, importance is indicated by a value of a document data field. Documents with a high importance may have an importance data field set to 1. Documents with a normal importance may have the importance data field set to 2. Documents with a low importance may have the importance data field set to 3. In other embodiments, importance may have other values. During act 1002 a user clicks a button or selects a keyboard shortcut to create a node in a content pool. At act 1004 a determination is made regarding whether importance is defined. If importance is defined, then depth of the memory may be calculated as:

$$\text{DEPTH}=1-(\text{IMPORTANCE}\times0.25) \quad\quad (\text{act 1006})$$

and the calculated value of DEPTH may be returned.

If, during act 1004, a determination is made that importance is not defined, then importance may be assigned a value of 0.5 (act 1008) and, at act 1006, depth may be calculated as 1−(IMPORTANCE×0.25) and may be returned. In some embodiments, if importance is not defined, a value other than 0.5 may be assigned to importance.

Figure 11:
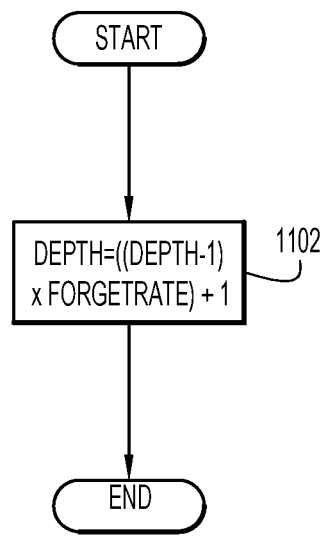
FIG. 11 explains an example process of an embodiment for increasing, when a document is opened, a retention period associated with a document represented by a node in a content pool.

As mentioned previously, when a document is opened and a node representing the opened document is displayed in the content pool, then the memory depth, or retention period, of the node is increased. The flowchart of FIG. 11 shows an example process for increasing the memory depth of a node in the content pool, which represents an opened document.

The new memory depth is calculated by subtracting 1 from DEPTH, multiplying a resulting value by FORGETRATE, which may be a configurable value, and then adding 1 (act 1102). FORGETRATE may have a value that is greater than 0 and less than 1 and represents a rate at which a node retention period of nodes in the content pool are decreased at particular times.

Figure 12:
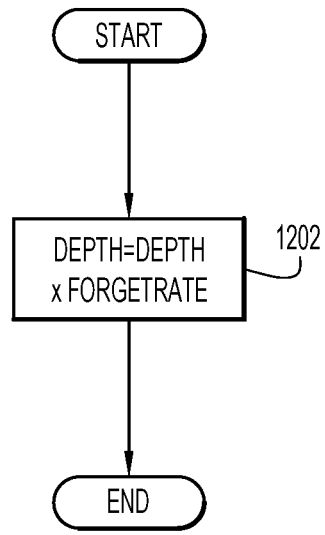
FIG. 12 explains an example process of an embodiment for decreasing, at a particular time, a retention period associated with a document represented by a node in a content pool.

At a particular time, the memory depth or retention period of documents having associated nodes in the content pool may be decreased if the retention period of the nodes is not already set to permanent. The flowchart of FIG. 12 illustrates an example process for decreasing the memory depth of a node in the content pool. At the particular time, which in some implementations may be midnight or another time of day, week, month, etc., the memory depth of documents represented by nodes in the content pool not having a permanent retention period may be decreased by multiplying the memory depth by the FORGETRATE (act 1202).

Figure 13:
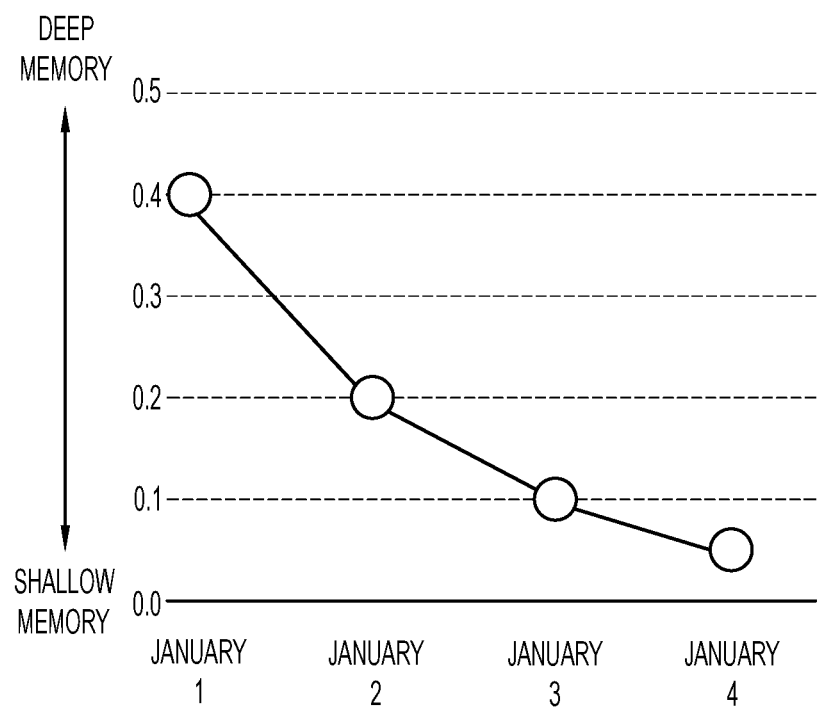
FIG. 13 is a graph which illustrates a decreasing retention period, over periods of time, for a document in a content pool according to an embodiment.

FIG. 13 is a graph showing a change in memory depth of a document when FORGETRATE is set to 0.5. As shown in the graph, the document may have a depth of 0.4 on January 1. At the particular time on January 2, the memory depth may be adjusted to 0.2 by multiplying 0.4 by 0.5. At the particular time on January 3, the memory depth may be adjusted to 0.1 by multiplying 0.2 by 0.5. At the particular time on January 4, the memory depth may be adjusted to 0.05 by multiplying 0.1 by 0.5.

Figure 14:
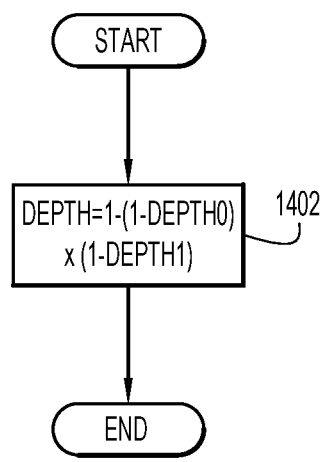
FIG. 14 explains how a retention period for a document in a content pool of an embodiment may be calculated for the document which was formed by merging two documents.

When two documents represented by nodes in the content pool are merged, the depth of the merged document may be based on a depth of each of the two documents. The flowchart of FIG. 14 illustrates that the depth of a merged document may be calculated according to $1-(1-DEPTH0)\times(1-DEPTH1)$, where DEPTH0 is a depth of one of the two documents and DEPTH1 is a depth of another of the two documents.

In some embodiments, the node may have a circular shape and a size of the node may be based on a memory depth of the node in the content pool and a DIAMETERRATE, which may be a configurable value that is greater than zero and less than 1.

Figure 15:
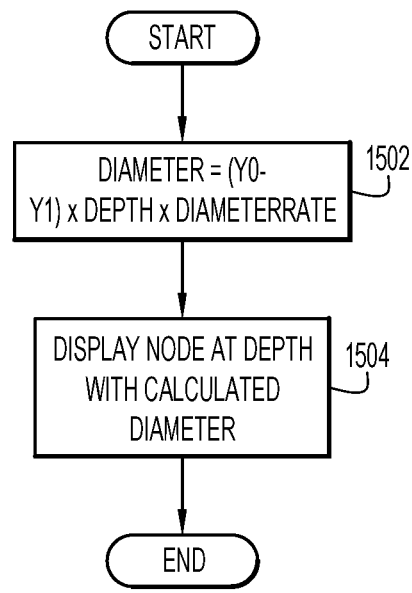
FIG. 15 is a flowchart of an example process of an embodiment for determining a size of a displayed node in a content pool based on a depth, or retention period, of the node.

FIG. 15 is a flowchart of an example process that may adjust a diameter of a displayed node after a depth of the node is changed. In this embodiment, a size of a diameter of a node may be an indication of a memory depth, or a node retention period. The deeper the memory depth of a node in a content pool (i.e., the longer the node retention period) the larger the diameter of the node. A diameter of the displayed node may be calculated according to $(Y0-Y1)\times DEPTH\times DIAMETERRATE$ (act 1502), where Y0 is a topmost vertical position of the content pool user interface and Y1 is a bottommost vertical position of the content pool user interface (act 1502). The node may then be displayed at the depth with the calculated diameter (act 1504).

Figure 16:
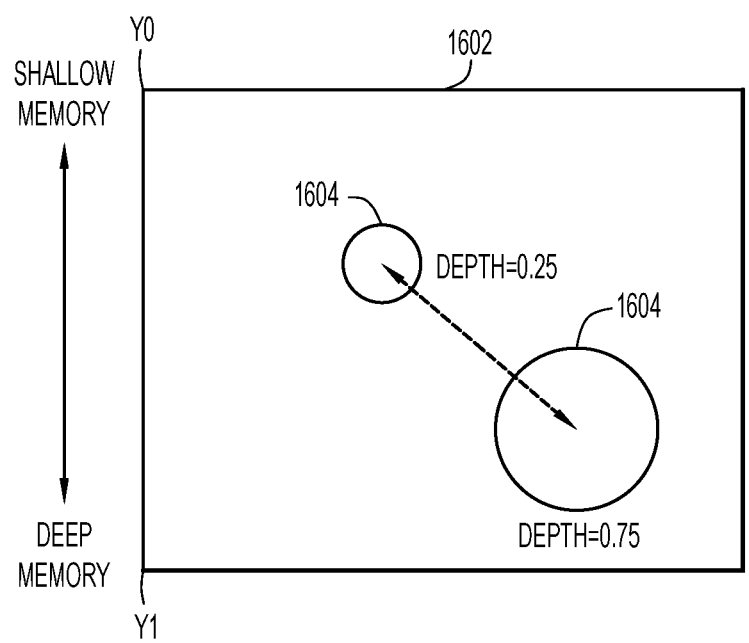
FIG. 16 illustrates a size difference of two nodes at different depths of a content pool of an embodiment.

FIG. 16 shows a first node 1604 in a content pool 1602 at a depth of 0.25 and a second node 1606 in content pool 1606 at a depth of 0.75. According to the process shown in FIG. 15, the first node would have a much smaller diameter than the second node, as shown in FIG. 16.

Figure 17:
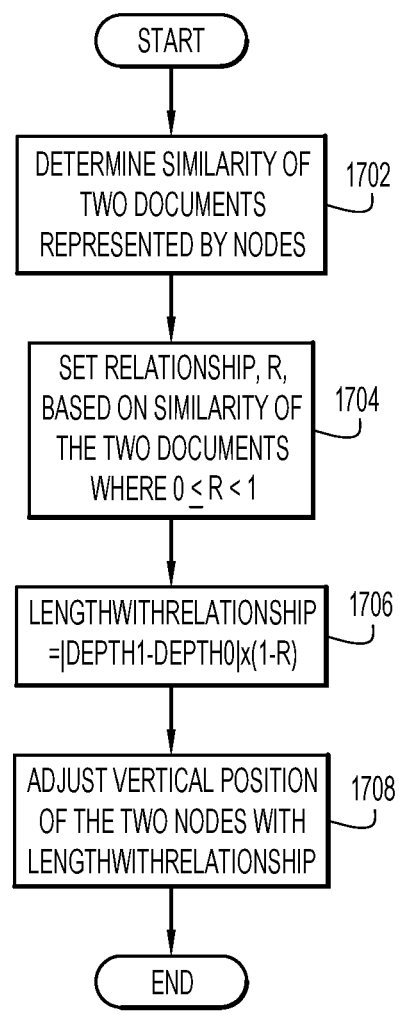
FIG. 17 is a flowchart of an example process of an embodiment for determining a relationship between two nodes in a content pool.

FIG. 17 is a flowchart of a process that determines whether two documents represented by nodes in the content pool are related. As new nodes are added to a content pool, the process may begin by determining a similarity between a document represented by the new node and each of other documents represented by nodes in the content pool (act 1702). Based on the determined similarity, a relationship R between the two documents may be set such that $0 \le R<1$ (act 1704). The greater the value of R, the more similar are the two documents. Next, LENGTHWITHRELATIONSHIP, which is a vertical distance between the two nodes, may be calculated based on a memory depth of each of the two nodes and the value of the relationship R, according to a formula:

$$LENGTHWITHRELATIONSHIP=|DEPTH1-DEPTH0|\times(1-R),$$

where DEPTH0 and DEPTH1 are memory depths of each of the two nodes in the content pool (act 1706). A vertical position of the two nodes may then be adjusted according to the calculated LENGTHWITHRELATIONSHIP (act 1708). In some embodiments, the node with the smaller retention period may be moved such that a vertical distance between the two nodes is equal to LENGTHWITHRELATIONSHIP.

Figure 18:
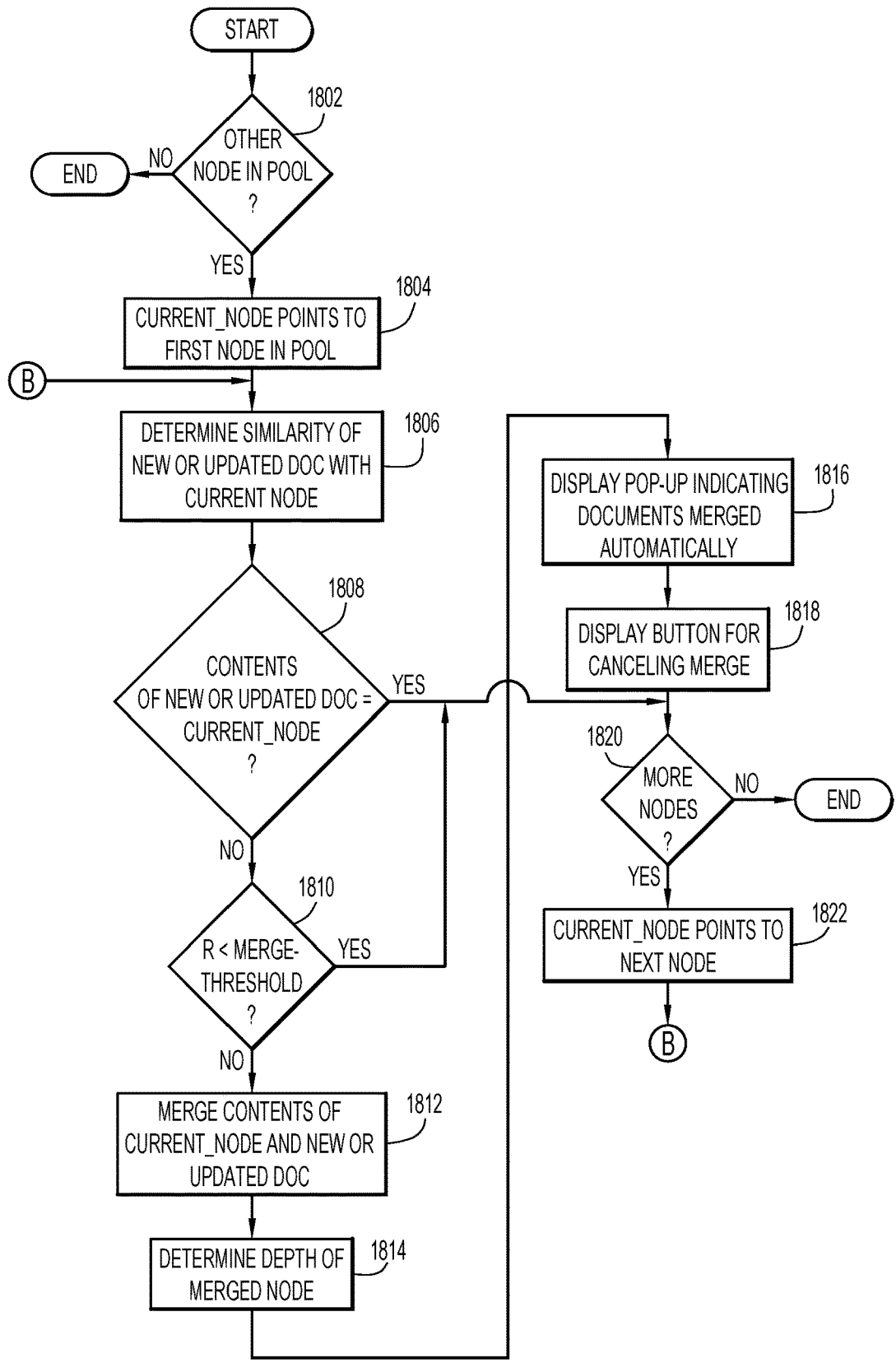
FIG. 18 is a flowchart of an example process of an embodiment that may be performed after a document is created or updated.

FIG. 18 is a flowchart of an example process that may be performed in some embodiments after completing an update of a document that is not in the content pool or after creating a document that is not in the content pool. The process may begin with determining whether there is another node in the content pool (1802). If no other node is in the content pool, then the process ends. Otherwise, a variable, CURRENT_NODE, may be sent to point to another node (act 1804).

Next, a similarity between the new or updated document is determined with respect to the node pointed to by CURRENT_NODE (act 1806). A determination may then be made to determine whether content of the new or updated document is identical to content associated with the node pointed to by CURRENT_NODE (act 1808). If the two documents are determined to be identical, then a determination may be made regarding whether any additional nodes exist in the content pool (act 1820). If no additional nodes exist in the content pool, then the process is completed. Otherwise, the pointer, CURRENT_NODE, is set to point to a next node in the content pool (act 1822). The process may then continue with act 1806.

If, during act 1808, the document represented by the node pointed to by CURRENT_NODE is determined not to be identical to the updated or newly created document that is not in the content pool, then a determination may be made regarding whether relationship R is a less than a configurable MERGETHRESHOLD (act 1810). If R is determined to be less than MERGETHRESHOLD, then act 1820 and following acts may be performed. Otherwise, the content of the new or updated document and the content of the document associated with the node pointed to by CURRENT_NODE may be merged (act 1812). The contents may be merged using any conventional merging algorithm.

Next, a memory depth of the node representing contents of the merged documents may be calculated (act 1814). In some embodiments a pop-up indication may be displayed to indicate that the contents of the two documents were automatically merged (act 1816). In other embodiments, before actually merging the two documents, a button may be displayed near the node pointed to by CURRENT_NODE and the automatic merge may be canceled by selecting the button within a predefined period of time using a pointing device or via another method. Item 606 in FIG. 6 displays an example button for canceling a merge. Acts 1820 and 1822 may then be performed as previously described.

Figure 19:
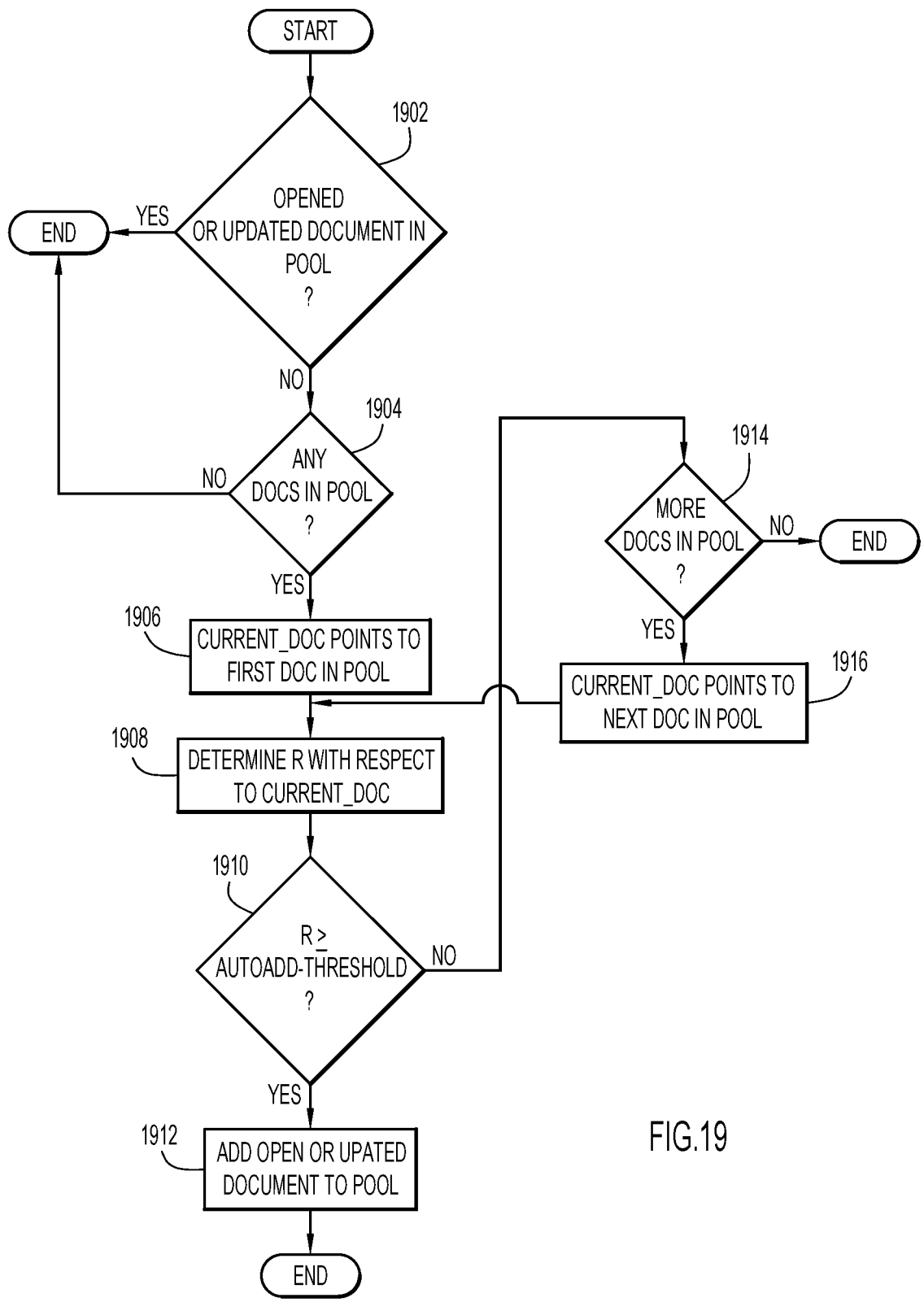
FIG. 19 is a flowchart of an example process of an embodiment that may be performed for automatically adding a document to a content pool when the document is opened or updated, not already in the content pool, and has a relationship value greater than a predefined threshold value with respect to a second document that is already in the content pool.

FIG. 19 is a flowchart of an example process that may be performed in various embodiments after a document is opened or updated. The process may begin with determining whether the opened or updated document is already in the content pool (act 1902). If the document is already in the content pool, then the process may be completed. Otherwise, a determination may be made regarding whether any documents represented by nodes are in the content pool (act 1904). If no nodes are in the content pool, then the process may be completed. Otherwise, a pointer CURRENT_DOC is set to point to a first document represented by a node in the content pool (act 1906). A relationship R between the opened or updated document and the document pointed to by CURRENT_DOC may be determined based on a similarity between the documents (act 1908).

Next, a determination may be made regarding whether the value of R is greater than or equal to AUTOADDTHRESHOLD, which may be configurable and may have a value greater than zero and less than one (act 1910). If R is determined to be greater than or equal to AUTOADDTHRESHOLD, then the updated or open document may be added to the content pool automatically and may be indicated as having a relationship with the node pointed to by the pointer CURRENT_DOC (act 1912). The process may then be completed. In some embodiments, a line displayed between two nodes may indicate a relationship between the nodes. See FIG. 6, which indicates a relationship between node M and node P and a relationship between node M and node N.

If, during act 1910, R is determined to not be greater than or equal to AUTOADDTHRESHOLD, then a determination may be made regarding whether any additional docs are represented by nodes in the content pool (act 1914). If no additional documents are represented in the content pool by nodes then the process is completed. Otherwise, the pointer CURRENT_DOC is set to point to a next document represented by a node in the content pool and the process continues from act 1908.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, etc.). These systems may include any types of monitors and input devices (e.g., keyboard, mouse, voice recognition, etc.) to enter and/or view information.

It is to be understood that the software of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and may communicate via any suitable communications medium (e.g., LAN, WAN, Intranet, Internet, hardwired, modem connection, wireless, etc.). For example, the functions of the present invention embodiments may be distributed in any manner among the various systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to a server and/or client systems. The database systems and/or storage structures may be remote from or local to the computer or other processing systems, and may store any desired data.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

We claim:

1. A method for automatically managing contents of a plurality of documents in a memory, the method comprising:

displaying, by a computing device, a content pool graphical user interface on a display, the content pool graphical user interface including a node retain area and a node delete area, the node retain area having a plurality of retention periods for retaining the contents of the plurality of documents, a distance from the node delete area of a node displayed in the node retain area indicating a relative length of a retention period of content associated with the node such that the content associated with the node has a relatively longer retention period when the node is displayed further from the node delete area than the retention period of the content when the node is displayed closer to the node delete area;

displaying, by the computing device, a second node associated with a content of a document in a drop position of the content pool graphical user interface in response to a user selecting the document via the computing device and dropping the document on the drop position in the node retain area of the content pool graphical user interface;

setting, by the computing device, a retention period of the second node based on the drop position in the node retain area;

moving, by the computing device after a passing of a period of time, the second node toward the node delete area of the content pool graphical user interface while decreasing the set retention period; and deleting, by the computing device, the second node in response to the second node being moved into the node delete area.

2. The method of claim 1, wherein a first node displayed at a first position in the content pool graphical user interface that is further from the node delete area than a second position of a third node in the content pool graphical user interface has a longer retention period than a retention period of the third node.

3. The method of claim 1, further comprising:
increasing, by the computing device, the retention period of the second node and moving a position of the second node in the content pool graphical user interface away from the node delete area based on a number of times the content associated with the second node is accessed.

4. The method of claim 1, further comprising:
visually displaying in the content pool graphical user interface a respective line connecting each pair of nodes of one or more pairs of nodes in the node retain area based on a relationship between the each pair of nodes of the one or more pairs of nodes.

5. The method of claim 1, further comprising:
merging two nodes in the displayed content pool graphical user interface when the two nodes are related to each other.

6. The method of claim 5, wherein the merging of the two nodes is automatically performed when the two nodes have a percentage of similar content greater than a predefined threshold.

7. The method of claim 1, further comprising
changing, by the computing device, a vertical distance between related nodes in the displayed content pool graphical user interface, a strength of a relationship between the related nodes being indicated by the vertical distance therebetween such that a first pair of related nodes are positioned vertically closer to each other in the content pool graphical user interface than a second pair of related nodes having a weaker relationship than a relationship between the first pair of the related nodes.

8. A computing device for automatically managing content of a plurality of documents in a memory, the computing device comprising:

at least one processor;
a memory;
a display device; and
a bus connecting the at least one processor with the memory and the display device, wherein the memory includes instructions for the at least one processor to be configured to:

display a content pool graphical user interface on the display device, the content pool graphical user interface including a node retain area and a node delete area, the node retain area having a plurality of retention periods for retaining the contents of the plurality of documents, a distance from the node delete area of a node displayed in the node retain area indicating a relative length of a retention period of content associated with the node such that the content associated with the node has a relatively longer retention period when the node is displayed further from the node delete area than the retention period of the content when the node is displayed closer to the node delete area;

display, on the display device, a second node associated with a content of a document in a drop position of the node retain area of the content pool graphical user interface in response to a user selecting and dropping the document on the drop position;

set a retention period of the second node based on the drop position in the node retain area;

move, after a passing of a period of time, the second node toward the node delete area of the content pool graphical user interface while decreasing the set retention period; and delete the second node in response to the second node being moved into the node delete area.

9. The computing device of claim 8, wherein a first node displayed at a first position in the content pool graphical user interface that is further from the node delete area than a second position of a third node in the content pool graphical user interface has a longer retention period than a retention period of the third node.

10. The computing device of claim 8, wherein the at least one processor is further configured to:
increase the retention period of the second node and move a position of the second node in the content pool graphical user interface away from the node delete area based on a number of times the content associated with the second node is accessed.

11. The computing device of claim 8, wherein the at least one processor is further configured to:

visually display in the content pool graphical user interface a respective line connecting each pair of nodes of one or more pairs of nodes in the node retain area based on a relationship between the each pair of nodes of the one or more pairs of nodes.

12. The computing device of claim 11, wherein the at least one processor is further configured to:
automatically merge two nodes in the displayed content pool graphical user interface when the two nodes have a percentage of similar content greater than a predefined threshold.

13. The computing device of claim 8, wherein the at least one processor is further configured to:
automatically add a third node, associated with content of a new or updated document, to the displayed content pool graphical user interface when a relationship between the content of the new or updated document and content associated with a node already displayed in the content pool graphical user interface is greater than a predefined relationship threshold.

14. The computing device of claim 8, wherein the at least one processor is further configured to:
merge contents of two nodes of the content pool graphical user interface when the two nodes are positioned to be superimposed on each other.

15. The computing device of claim 8, wherein the at least one processor is further configured to:
change a vertical distance between related nodes in the displayed content pool graphical user interface, a strength of a relationship between the related nodes being indicated by the vertical distance therebetween such that a first pair of related nodes are positioned vertically closer to each other in the content pool graphical user interface than a second pair of related nodes having a weaker relationship than a relationship between the first pair of the related nodes.

16. A computer program product comprising:
at least one computer readable storage medium having computer readable program code embodied therewith for execution on a computing device, the computer readable program code being configured to be executed by the computing device to:
display a content pool graphical user interface on a display, the content pool graphical user interface including a node retain area and a node delete area, the node retain area having a plurality of retention periods for retaining contents of a plurality of documents, a distance from the node delete area of a node displayed in the node retain area indicating a relative length of a retention period of content associated with the node such that the content associated with the node has a relatively longer retention period when the node is displayed further from the node delete area than the retention period of the content when the node is displayed closer to the node delete area;
display a second node associated with content of a document in a drop position of the content pool graphical user interface in response to a user selecting the document via the computing device and dropping the document on the drop position in the node retain area;
set a retention period of the second node based on the drop position in the node retain area;
move, after a passing of a period of time, the second node toward the node delete area of the content pool graphical user interface while decreasing the set retention period; and
delete the second node in response to the second node being moved into the node delete area.

17. The computer program product of claim 16, wherein a first node displayed at a first position in the content pool graphical user interface that is further from the node delete area than a second position of a third node in the content pool graphical user interface has a longer retention period than a retention period of the third node.

18. The computer program product of claim 16, wherein the computer readable program code is further configured to be executed by the computing device to:
increase the retention period of the second node and move a position of the second node in the content pool graphical user interface away from the node delete area based on a number of times the content associated with the second node is accessed.

19. The computer program product of claim 16, wherein the computer readable program code is further configured to be executed by the computing device to:
visually display in the content pool graphical user interface a respective line connecting each pair of nodes of one or more pairs of nodes in the node retain area based on a relationship between the each pair of nodes of the one or more pairs of nodes.

20. The computer program product of claim 16, wherein the computer readable program code is further configured to be executed by the at least one computing device to:
repeatedly move, after a passing of each period of time, the second node toward the node delete area of the displayed content pool graphical user interface while decreasing the set retention period.

* * * * *